J. LOWRY & D. HUNT.
Wind-Wheel.
No. 219,746.  Patented Sept. 16, 1879.
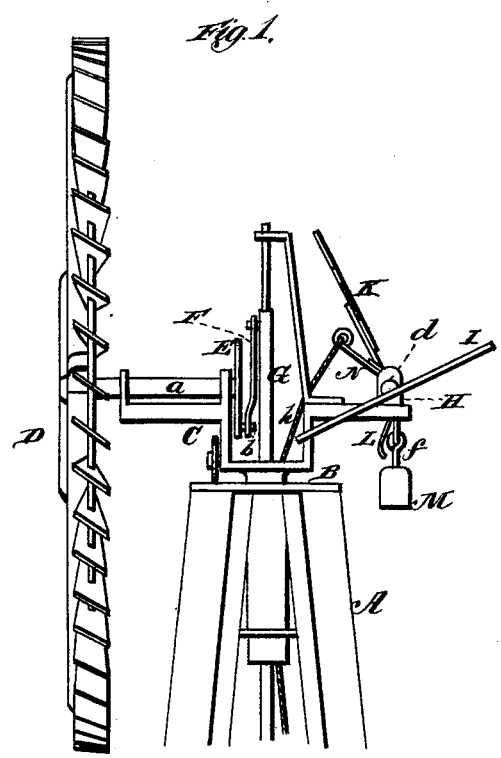
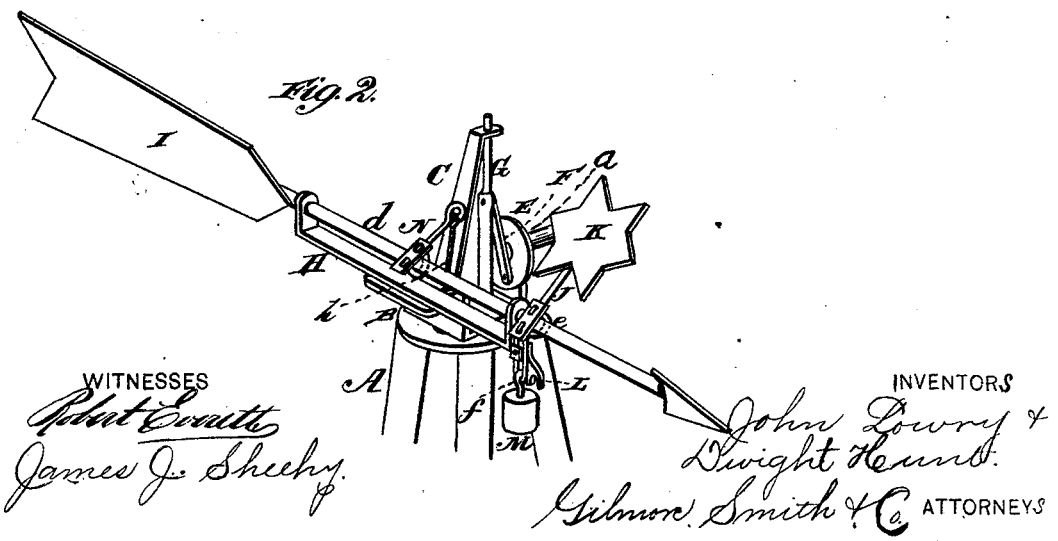

UNITED STATES PATENT OFFICE.

JOHN LOWRY AND DWIGHT HUNT, OF ANN ARBOR, MICHIGAN.

IMPROVEMENT IN WIND-WHEELS.

Specification forming part of Letters Patent No. 219,746, dated September 16, 1879; application filed June 28, 1879.

*To all whom it may concern:*

Be it known that we, JOHN LOWRY and DWIGHT HUNT, of the city of Ann Arbor, in the county of Washtenaw and State of Michigan, have invented certain new and useful Improvements in Wind-Wheels; and we do hereby declare that the following is a full, clear, and exact description of the construction and operation of the same, reference being had to the annexed drawings, making a part of this specification, and to the letters and figures of reference marked thereon.

Figure 1 of the drawings is a representation of a side elevation of our windmill, and Fig. 2 is a perspective view of the same.

The nature of our invention relates to certain improvements upon the windmill for which Letters Patent No. 196,685 were granted to us, as will be hereinafter more fully set forth.

The annexed drawings, to which reference is made, fully illustrate our invention.

A represents the tower of the windmill, with a turn-table, B, carrying a suitable frame, C, in which are bearings for the wind-wheel shaft $a$. On the outer end of this shaft is secured the wind-wheel D, and on the inner end a disk, E, having a wrist-pin, $b$. On this wrist-pin is placed one end of the pitman F, the other end of which is pivoted to the rod G, which moves perpendicularly in suitable guides in the frame C.

On the opposite side of the frame C from the wind-wheel is a horizontal cross-bar, H, which forms bearings at its ends for the rod or shaft $d$, having the main vane I attached to it at one end. On the rod $d$ is, by means of a clip, $e$, fastened an arm, J, which has at one end a small or star vane, K, attached to it. The arm J should be so adjusted on the rod $d$ that when the main vane is horizontal the small vane should be perpendicular, and vice versa. The other end of the arm J is slotted, and has a weight, M, suspended from it by a hook or link, $f$. The action of this weight is to hold the small vane K in a perpendicular position, when the main vane I will be horizontal and the wheel will be in the wind. If the wind increases the vane K will be turned down more or less toward a horizontal position, which correspondingly raises the main vane I toward a perpendicular position, and the wheel is accordingly brought more or less out of the wind. As the wind decreases the weight M reverses this action, and the wheel is brought into the wind again.

To the slotted end of the arm J is attached a claw or fork, L, which has the following function: When the vane K stands perpendicular the weight hangs loose, and also while said vane and the arm turns for a certain distance; but after it passes a certain point the claw or fork L takes hold of the weight or of the hook $f$ in such a manner as to hold the weight rigid, whereby as the vane K continues to turn the leverage is increased, so that more force is required to turn down said vane still farther, and thus the wheel cannot be thrown entirely out of the wind except by an extraordinarily strong wind.

On the rod or shaft $d$ is further, by a clip, secured an arm, N, from the end of which a rope or chain, $h$, is passed over a pulley in the frame C, and down through to the foot of the tower, for stopping the mill when required.

It will be noticed that we dispense with all connections between the vane-shaft $d$ and the wind-wheel, and regulate the wheel by the action of the wind on the vane K.

We claim—

The claw or fork L, in combination with the arm J and weight M, for the purposes herein set forth.

In testimony that we claim the above we have hereunto subscribed our names in the presence of two witnesses.

JOHN LOWRY.
DWIGHT HUNT.

Witnesses:
WM. W. WHEDON,
A. B. HERMAN.